July 18, 1939. A. MENZER 2,166,603
TEMPERATURE-COMPENSATED INDICATING INSTRUMENT
Filed May 21, 1937
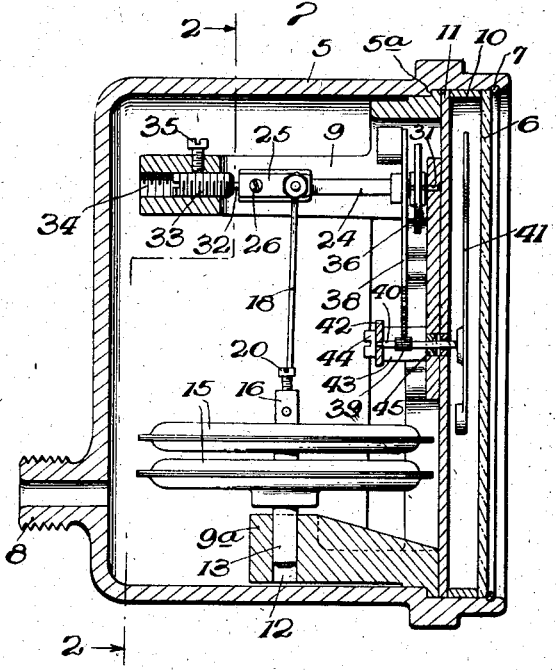
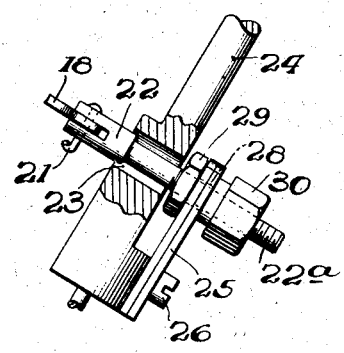
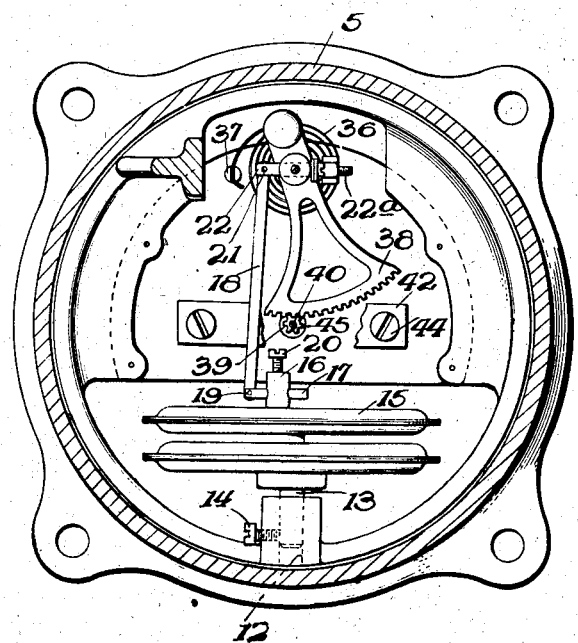
INVENTOR
*Anton Menzer*
BY
*Stephen Cerstvik*
ATTORNEY Patented July 18, 1939

2,166,603

UNITED STATES PATENT OFFICE 2,166,603

TEMPERATURE-COMPENSATED INDICATING INSTRUMENT

Anton Menzer, Brooklyn, N. Y., assignor to Bendix Aviation Corporation, South Bend, Ind., a corporation of Delaware Application May 21, 1937, Serial No. 144,094

3 Claims. (Cl. 73—4)

The present invention relates to indicating instruments and more particularly to means for compensating the effect of temperature upon an indicating instrument.

Instruments utilizing expansible or resilient elements as actuating means are subject to various sources of error. Upon a change in temperature, for instance, the modulus of elasticity of the material used in the expanding or resilient element changes, thereby causing error.

Accordingly, one of the objects of the present invention is to provide novel means in an indicating or measuring instrument, whereby the foregoing undesirable characteristic is eliminated.

Another object is to provide in an indicating or measuring instrument novel means whereby changes in the modulus of elasticity of the actuating element due to changes in temperature are compensated to eliminate errors in the instrument.

A further object is to provide novel means whereby the means utilized to compensate for changes in the modulus of elasticity may be adjusted so that the most effective compensation can be produced.

The above and further objects and advantages of the invention will appear more fully hereinafter from a consideration of the detailed description which follows, taken together with the accompanying drawing, wherein is illustrated one embodiment of the invention. It is to be expressly understood, however, that the drawing is for the purpose of illustration and description only and is not designed as a definition of the limits of the invention reference being had for this purpose to the appended claims.

In the drawing wherein like reference characters refer to like parts throughout the several views;

Fig. 1 is a side elevation, partly in section, of a device embodying the invention;

Fig. 2 is a section taken along the line 2—2 of Fig. 1; and

Fig. 3 is a detailed view, partly in section, of a part of the device, showing the manner of mounting the bi-metal element and rockshaft arm.

Referring to the drawing wherein the invention is illustrated as applied to an altimeter, the operating mechanism of the altimeter is shown as enclosed in a casing 5, said casing being closed by a cover glass 6 held in place by a resilient ring 7. Screw fitting 8 extending rearwardly of the casing provides means for introducing the outside static air pressure to the interior of the instrument casing.

The operating mechanism is mounted on a frame of any suitable type, comprising casting 9 held in place by spacer ring 10 which holds the frame against an annular abutment 5a formed in the casing, by pressing against dial 11 abutting the face of the casting 9.

Mounted on base 9a in opening 12 by means of rod 13 and screw 14 (see Fig. 2) are diaphragms 15. Adjustably mounted in a post 16 extending from the top diaphragm, is a rod 17 to which is pivoted one end of a diaphragm link 18 by pin 19. Rod 17 may be of bi-metal, if desired, in order to provide temperature compensation at the zero indication of the altimeter. Screw 20 fastens the rod 17 in place after it has been properly adjusted.

The novel means of the invention are now provided and for this purpose one end of the rockshaft arm 22 is rotatably connected to the other end of link 18 by pin 21 (see Fig. 3) while said arm passes freely through opening 23 in the rock shaft 24 and is threaded at 22a whereby it is adjustably connected to a bi-metal element 25 fastened to the rockshaft by screw 26. In accordance with the invention the arm 22 passes through an opening 28 in the bi-metal element 25 and is adjustably connected thereto by nuts 29 and 30 cooperating with the threaded end 22a of the rock shaft arm 22.

Bi-metal element 25 is constructed of two different metals in a manner well-known in the art and is mounted parallel to the axis of rockshaft 24. Upon expansion and contraction of the bi-metal element with changes in temperature, effective lever arm between the link 18 and the rockshaft 24 is varied. By changing the connection of rockshaft arm 22 to the bi-metal element 25 by means of nuts 29 and 30 and the screw threaded end 22a of the rockshaft arm, the initial setting of arm 22 may be adjusted.

The novel means transmit the motion of the diaphragms to the rockshaft 24 which is mounted for rotation by an extension on one end thereof journaled at 31 (see Fig. 1) in the face of casting 9 and by a journal formed in the other end of said rockshaft cooperating with an extension 32 of an adjustable member 33 held in place in an opening 34 by screw 35. Mounted on the rockshaft 24 at one end thereof and fastened thereto is the hair spring 36 whose other end is fastened to the frame by clamping it in an opening in rod 37 (see Fig. 2). This spring serves to take up the backlash between the sector 38 and pinion 39.

The sector 38 is mounted for rotation with rockshaft 24 and meshes with pinion 39 integral with shaft 40 carrying pointer 41 at one end thereof moving over a scale on dial 11. Shaft 40 is journaled at one end in plate 42 mounted on the frame by spacers 43 and screws 44 and is journaled near the pointer end at 45.

With changes in temperature the modulus of elasticity of the diaphragm changes. This change is indicated by a coefficient called the coefficient of the modulus of elasticity. Upon a change in the modulus; for a given increment in pressure, a different increment of expansion of the diaphragm is produced at different temperatures. In order to compensate for this change, the bi-metal is designed so that such change in expansion in the diaphragms will be compensated by a change in the effective lever arm between the link 18 and the rockshaft.

If the diaphragm is constructed of an ordinary metal having a negative temperature coefficient of modulus of elasticity, upon a decrease of temperature the amount of expansion of said diaphragm for a certain increment of pressure will be reduced from what it would be at a higher temperature. This reduction in expansion would be indicated by a reduced movement of the pointer. In order to compensate for said reduction the bi-metal element is so designed and mounted that it moves away from the rockshaft with a decrease in temperature thereby reducing the effective lever arm between link 18 and said rockshaft. By the reduction of said lever arm the point of application of the force due to the expanding diaphragm travels in a circular path of smaller radius whose center is the center of the rockshaft. A smaller expansion of the diaphragm, therefore, is changed to an increased angular rotation of rockshaft 24 and such increased angular rotation is transmitted to the pointer thereby offsetting the reduced movement of the pointer due to the lesser expansion of the diaphragm at said lower temperature.

The mounting of the bi-metal element 25 parallel to the rockshaft and the adjustable connection of rockshaft arm 22 at right angles thereto provide a mechanism whereby the initial lever arm between the link and the bi-metal element can be accurately adjusted thereby enabling the adjustment of said lever arm so that the most effective compensation can be produced without injury to the bi-metal element or any impairment of the functions thereof.

The operation is as follows: When the diaphragms expand, due, for instance, to a decrease in pressure on the outside thereof, diaphragm link 18 is moved upwardly to actuate the rockshaft arm 22 to thereby rotate rockshaft 24. The effective lever arm between link 18 and the rockshaft is varied by movement of bi-metal element 25 with temperature changes thereby offsetting changes in the expansion in the diaphragms due to changes of temperature affecting the modulus of elasticity.

The movement transmitted to the rockshaft 24 rotates the gear sector 38 thereby rotating pinion 39 and shaft 40 to rotate the pointer 41. Spring 36 serves to take up any backlash between sector 38 and pinion 39.

Means are therefore provided whereby errors due to temperature are compensated and the most efficient setting for proper compensation can be accurately determined and set.

Although but one embodiment has been illustrated and described, further changes and modifications in form, materials and relative arrangements of parts, which will now appear to those skilled in the art, may be made without departing from the scope of the invention. Reference, therefore, is to be had to the appended claims for a definition of the limits of the invention.

What is claimed is:

1. In a device of the character described, a rockshaft, a bi-metal element spaced parallel to said rockshaft and attached thereto at one end of said element, an opening in said rockshaft, an opening in said element, and an arm passing through said openings and adjustably attached to the other end of said element whereby said arm may be freely moved through the opening in said rockshaft by the movement of said element with changes in temperature.

2. In a device of the character described a movable diaphragm, means mounted for rotation by the motion of said diaphragm, a bi-metal element connected to said first means at one end thereof, means connecting the other end of said element to said diaphragm, one end of said connecting means having a threaded portion passing through said element, and means for locking said connecting means to said element at adjustable positions along said threaded portion.

3. In a device of the character described, an aneroid, a rockshaft, a bi-metal element, means mounting said bi-metal element on said rockshaft and parallel thereto, means connecting said aneroid and said bi-metal element including an arm, and means whereby said arm may be connected to said element at various points along the length of said arm.

ANTON MENZER.